United States Patent [19]

Furuta

[11] 4,389,685
[45] Jun. 21, 1983

[54] CUE SIGNAL GENERATING SYSTEM

[75] Inventor: Kenzi Furuta, Hachioji, Japan

[73] Assignee: Olympus Optical Co., Ltd., Tokyo, Japan

[21] Appl. No.: 171,970

[22] Filed: Jul. 24, 1980

[30] Foreign Application Priority Data

Aug. 23, 1979 [JP] Japan .................. 54-107516

[51] Int. Cl.³ .................. G11B 15/18; G11B 5/43
[52] U.S. Cl. .................. 360/72.2; 360/8; 360/27
[58] Field of Search .................. 360/74.4, 55, 27, 8, 360/72.2

[56] References Cited

U.S. PATENT DOCUMENTS

| 2,807,797 | 9/1957 | Shoemaker | 360/28 |
| 3,048,830 | 8/1962 | Haslam et al. | 360/28 |
| 3,584,158 | 6/1971 | Jefferies et al. | 360/8 |

FOREIGN PATENT DOCUMENTS 51-26257 of 1976 Japan .
51-26258 of 1976 Japan .
51-36608 of 1976 Japan .

Primary Examiner—Vincent P. Canney
Attorney, Agent, or Firm—Frishauf, Holtz, Goodman & Woodward

[57] ABSTRACT

In a cue signal generating system applied to a tape recorder which detects a cue signal by a reel drive of the tape, there is produced at least two different cue signals having the following relation $$f1/f2 > d1/d2$$

where d1 is the maximum wound tape diameter of the drive reel for the tape used, d2 is the minimum wound tape diameter of the drive reel, f1 is first frequency information contained in a first cue signal of a plurality of different cue signals and f2 is second frequency information of a second cue signal which is lower in frequency than said first frequency information f1.

6 Claims, 3 Drawing Figures

CUE SIGNAL GENERATING SYSTEM

BACKGROUND OF THE INVENTION

The present invention relates to a cue signal generating system for generating a plurality of different cue signals used for cuing recorded contents and an apparatus applying the cue signal generating system.

A dictation tape recorder frequently uses a cue signal to quickly search for a desired portion in the recorded contents of the tape and to make a cue or check of the desired portion. For cuing distinctively a plurality of recorded contents, a plurality of cue signals are used. For example, in the recording of a meeting or conference, a first cue signal is assigned to a speech of Mr. A and a second cue signal to a speech of Mr. B.

The cuing by using the cue signal should be made in a high speed reproduction mode, e.g. 15 to 60 times that of a constant speed reproduction mode. For this reason, the tape is traveled in the cuing operation by a reel drive. In the reel drive operation, the tape travel speed changes in accordance with a tape diameter taken up by the drive reel. As a result, the frequency of the played back cue signal so changes in accordance with the wound tape diameter. It is feared, therefore, that when a plurality of cue signals with corresponding different frequencies are used, those different cue signals might be indistinctive in the high speed reproduction mode.

SUMMARY OF THE INVENTION

Accordingly, an object of the present invention is to provide a cue signal generating system which can discriminate a plurality of different cue signals irrespective of change of a tape speed when the cue signals are reproduced, and an apparatus for applying the cue signal generating system.

To achieve the above object of the invention, the cue signal generating system according to the invention has a larger ratio between frequencies of two cue signals of those different ones than a change ratio of the tape speed. The selection of such a frequency ratio substantially eliminates that chance that frequency changes of the cue signals due to the tape speed change will cause frequency overlap of the reproduced cue signals. Consequently, using the cue signal generating system of the invention, one can discriminate any two cue signals independently of the tape speed change.

DETAILED DESCRIPTION OF THE PREFERRED EMBODIMENT

Figure 1:
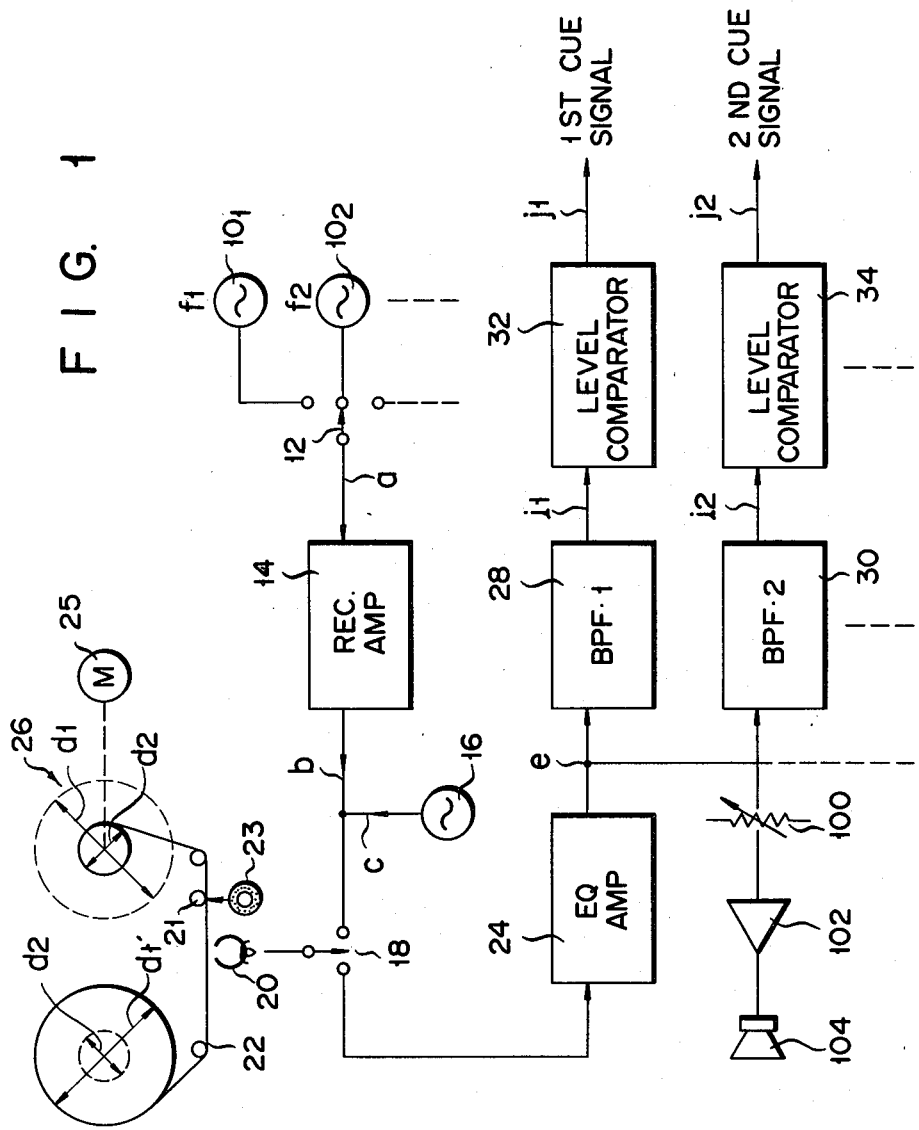
FIG. 1 is a block diagram of an embodiment of an apparatus to which the cue signal generating system is applied.

FIG. 1 is an example of a construction of an apparatus implementing a cue signal generating system according to the present invention. A plurality of cue signals $10_1$, $10_2$, . . . are inputted into a cue signal selecting switch 12. The switch 12 is switched in accordance with the contents of the record. For example, to record a speech of Mr. A, the switch 12 selects the first cue signal source $10_1$ of a frequency f1. For recording a speech of Mr. B, the same selects the second cue signal source $10_2$ of frequency f2. A cue signal a thus selected is inputted to a record amplifier 14. A cue signal b produced from the record amplifier 14 is superposed on a bias current c supplied from a bias signal source 16, and the resulting superposed signal is applied to a record/reproduction head 20, through a record/reproduction switch 18.

The cue signal b of the frequency f1 or f2 applied to the head 20 is recorded on a magnetic tape 22 running at a fixed tape speed, for example, 2.4 cm/s, by the combination of a capstan 21 and a pinch roller 23. Only two cue signals of 50 Hz for f1 and 20 Hz for f2 will be used in the description to follow for ease of explanation. These two signals of 50 Hz and 20 Hz are recorded on the tape running at 2.4 cm/s. The recording level at this time is selected at a magnetic saturation level of the tape 22.

For cuing the recorded contents of the tape 22, the head 20 is coupled with the input terminal of an equalizer amplifier 24 by way of the switch 18. The frequency of the cue signal contained in a signal e produced from the equalizer 24 is proportional to the tape speed. The tape speed, in the case of the reel drive, changes in proportion to a diameter d of the wound tape around a take-up reel 26 which is driven by a reel motor 25. The tape speed v is given $$v = \pi d \omega \quad (1)$$

where $\omega$ is a rotary speed of the take-up reel when the cue signal is searched. The maximum wound tape diameter d1 of the reel 26 is related to the minimum one d2 by $d1 \geq d \geq d2$. In the case of the reel drive, the maximum tape speed v1 and the minimum tape speed v2 are expressed by $$v1 = \pi d1 \omega \quad (2)$$

$$v2 = \pi d2 \omega \quad (3)$$

when d1=2.4 cm, d2=1.2 cm and $\omega$=1.3 rps, v1≈9.8 cm/s and v2≈4.9 cm/s. In this case, the first cue signal of f1=50 Hz recorded at 2.4 cm/s is detected between 102 Hz ($\approx 50 \times 4.9/2.4$) and 204 Hz ($\approx 50 \times 9.8/2.4$). The second cue signal of f2=20 Hz recorded at 2.4 cm/s is detected between 41 Hz ($\approx 20 \times 4.9/2.4$) and 82 Hz ($\approx 20 \times 9.8/2.4$). Therefore, the first cue signal may be separated by using a band-pass filter 28 (BPF1) with a frequency band ranging from 100 Hz to 220 Hz. Similarly, the second cue signal may be separated by using a band-pass filter 30 (BPF2) with a frequency band ranging 40 Hz to 90 Hz. As in the above case where the cue signals used are only two and the frequency component of 40 Hz or less contained in the signal e is smaller than a threshold level to be described later, a low-pass filter with a cutoff frequency of about 90 Hz may be used for the filter 30.

Figure 2:
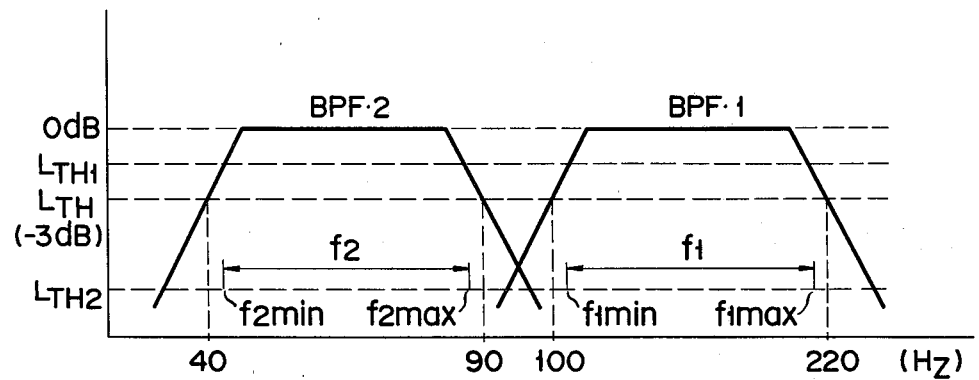
FIG. 2 is a graphical representation useful in explaining the operation of the apparatus shown in FIG. 1.

The signal e is applied to speaker 104, through a volume controller 100 and a power amplifier 102. The reproduced sound in searching the cue signal may be monitored by the speaker 104. The signal e is applied to a level comparator (level sensor) 32, by way of the filter 28. The signal e is also applied to another level comparator (level sensor) 34 by way of the filter 30. The threshold level $L_{TH}$ as shown in FIG. 2 is set up in the respective comparators 32 and 34. Only input signals i1 and i2 having levels beyond $L_{TH}$ are allowed to pass through the comparators 32 and 34. In this example, it is assumed that the flat response region of each filter 28 and 30 is set up with 0 dB=1 V. Further assume that the −3 db cutoff frequency of the filter 28 is: f1$_{max}$≈220 Hz and f1$_{min}$≈100 Hz, and the −3 dB cutoff frequency of the filter 30 is: f2$_{max}$≈90 Hz and f2$_{min}$≈40 Hz. The threshold level L$_{TH}$ is assumed to be 0.7 V (−3 dBV). In this case, the cue signal (f1) with a frequency distribution ranging from 102 Hz to 204 Hz is detected as the first cue signal j1 and is produced from the comparator 32. The level of the cue signal (f1) with a frequency ranging from 102 Hz to 204 Hz is sufficiently attenuated by the filter 30, so that it can not pass through the comparator 34.

Similarly, the cue signal (f2) with a frequency distribution from 41 Hz to 82 Hz is detected as the second cue signal j2 and produced from the comparator 34. The level of the cue signal (f2) from 41 Hz to 82 Hz is sufficiently decreased by the filter 28, so that it can not pass through the comparator 32.

From the foregoing description and FIG. 2, the following will be seen. If the following relation (4) holds, $$f1_{min} > f2_{max} \quad (4)$$

the first cue signal j1 corresponding to the first cue signal source 10$_1$ and the second cue signal j2 corresponding to the second cue signal source 10$_2$ will be separated exactly. Incidentally, if the equation (4) is satisfied, the frequency characteristics of the filters 28 and 30, and the threshold level of the comparators 32 and 34 may be selected properly. For example, when the threshold level as denoted L$_{TH1}$ in FIG. 2 is used, the frequency pass band of each filter 28 and 30 is apparently narrowed. When the threshold level L$_{TH2}$ is used, the frequency pass band width of each filter 28 and 30 is widened apparently. Thus, even if the frequency characteristic of each filter 28 and 30 is fixed, the validity of the equation (4) depends on the threshold levels of the comparators 32 and 34. From this, it is seen that when the frequency characteristics of the filters 28 and 30 are not invariable, the equation (4) may be satisfied by individually adjusting the threshold levels of the respective comparators 32 and 34.

The equation (4) may be generalized as in the following. The cue signal frequency f when the cue signal is searched at the tape speed v, is $$f = f_o \times v/v_o \quad (5)$$

where v$_o$ is the tape speed when the cue signal of the frequency f$_o$ is recorded. The f1$_{min}$ in the equation (4) may be obtained from the equation (2) when v=v2=πd2ω and f$_o$=f1. Hence we have from the equation (5)

$$f1_{min} = f1 \times \pi d2\omega/v_o \quad (6)$$

Similarly, f2$_{max}$ is obtained from the equation (3) when v=v1=πd1ω and f$_o$=f2.

Therefore, we have $$f2_{max} = f2 \times \pi d1\omega/v_o \quad (7)$$

Substituting the equations (6) and (7) into the equation (4), we have $$f1 \times \pi d2\omega/v_o > f2 \times \pi d1\omega/v_o \quad (8)$$

The equation (8) is rewritten into $$f1/f2 > d1/d2 \quad (9)$$

The physical meaning of the equation (9) follows. In connection with any two cue signals of those ones, the frequency ratio f1/f2 of those signals is larger than the wound tape diameter ratio d1/d2 of the take-up reel 26. When d1/d2=2, for example, if the frequencies of the plurality of cue signals are different from each other by one octave or more, the equation (9) is satisfied.

Figure 3:
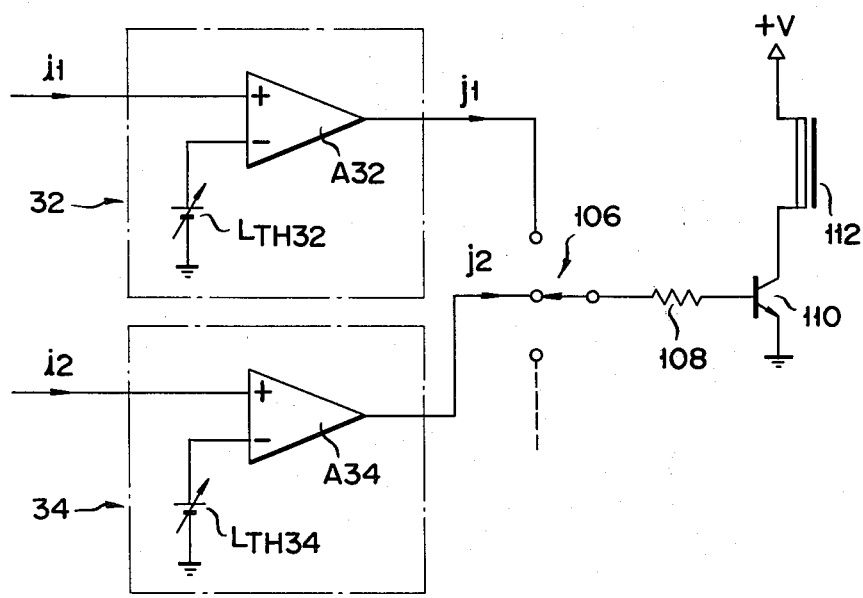
FIG. 3 is a circuit diagram of an auxiliary circuit used with the apparatus shown in FIG. 1.

FIG. 3 shows the comparators 32 and 34 shown in FIG. 1 and an example of an auxiliary circuit for processing the detected cue signals j1 and j2. The input signal i1 is applied to the non-inverted input of an operational amplifier A32. Applied to the inverted input of the amplifier A32 is a positive potential of a threshold level source L$_{TH32}$. The amplifier A32 produces the first cue signal j1 which changes from logic "0" to logic "1" when the potential of the input signal i1 exceeds the potential L$_{TH32}$. Similarly, the input signal i2 is applied to an amplifier A34 to produce the second cue signal j2 of logic "1" when the potential of the signal i2 exceeds the threshold level potential L$_{TH34}$. The cue signal j1 or j2 selected by the switch 106 is applied to the base of an NPN transistor 110 through a resistor 108. The transistor 110 is connected to ground at the emitter and at the collector to a positive power source +V by way of plunger or relay solenoid 112.

For example, when the switch 106 selects the signal j1, the portion of the tape where the output signal from the cue signal source 10$_1$ of FIG. 1 is recorded, is reproduced by the head 20, and the transistor 110 is turned on. Then, the solenoid 112 is energized and the motor 25 connected to the plunger is stopped. Following the stoppage of the motor, the tape 22 stops its traveling or it automatically shifts to the constant speed (2.4 cm/s) reproduction mode. When the switch 106 selects the signal j2, the transistor 110 is turned on when the portion of the tape where the output signal from the cue signal source 10$_2$ of FIG. 1 is recorded, is reproduced. In this way, only the portion of the tape where the output signal from the source 10$_1$ or from the source 10$_2$ is recorded, may automatically be detected depending on the selecting state by the switch 106.

The embodiment disclosed in the specification and the drawings is not intended to limit the present invention and may be modified or changed within the spirit of the present invention. Each of the cue signals supplied from the cue signal sources 10$_1$ and 10$_2$ may not be a single frequency. For example, a composite signal of 50 Hz and 60 Hz may be used for the first frequency information f1 of the first signal source while a composite signal of 15 Hz and 20 Hz may be used for the second frequency information f2 of the second cue signal source. In this case, when d1/d2=2 in the equation (9), the first signal distributes over a frequency range from 102 Hz to 245 Hz at the time of the cue signal search, and the second cue signal distributes over a frequency range from 31 Hz to 82 Hz. Therefore, if there are only the signal component with either of those frequency ranges, two different cue signals may be discriminated without being influenced by the tape speed change. It is evident that the present invention is applicable for discriminating three or more different cue signals. In this case, the number of the filters and the comparators corresponds that of the cue signals used.

The frequency of the cue signal f1 is preferably selected to be approximately 200 to 300 Hz or less in order to avoid interference of the cue signal with the recorded contents of dictation. A Hall head including a Hall element as an electromagnetic converting element can reproduce a signal of the DC region. Such a head principally has no lower limit of the frequency in the cue signal reproduction. When a coil type head 20 is used, the lower limit of the frequency of the cue signal is approximately 5 to 10 Hz in practice.

The cue signal generating system according to the present invention is applicable for U.S. Ser. No. 138,195 entitled "CUE SIGNAL RECORDING APPARATUS" filed on Apr. 7, 1980 and assigned to the same assignee as the present application. In this case, the construction shown in FIG. 1 may be applied for the cue signal generator 30, the BPF 38 and the level sensor 40 in FIG. 2 in the above U.S. application Ser. No. 138,195.

What is claimed is:

1. A cue signal generating system for a tape recorder having at least a recording mode and a cue signal detection mode, and which includes means for detecting cue signals recorded on a recording tape, means for causing said tape to travel by a take up reel drive during operation in the cue signal detection mode which produces a variable tape traveling speed during said cue signal detection mode, the variable tape traveling speed being a function of the tape roll diameter on the take up reel;

the cue signal generating system comprising means for producing and recording on said tape at least two different cue signals having the following relation:

$$f1/f2 > d1/d2$$

where d1 is the maximum tape roll diameter of said take up reel, d2 is the minimum tape roll diameter of said take up reel, f1 is first frequency information contained in a first cue signal of said at least two different cue signals, and f2 is second frequency information of a second cue signal of said at least two different cue signals, said recording second cue signal having a lower frequency than that of said first recorded cue signal, the ratio f1/f2 thereby being sufficiently large that there is substantially no overlap of said first and second frequency information (f1,f2) during cue signal detection in said variable speed cue signal detection mode.

2. The cue signal generating system of claim 1, wherein $d1/d2 > 1$.

3. In a tape recorder having at least a recording mode and a cue signal detection mode, apparatus for recording and detecting cue signals comprising:

tape travel means including a take up reel drive means, operable in said cue signal detection mode, for taking up a recording tape and for causing said recording tape to travel at a speed which constantly varies during a tape travel operation by said take up reel drive means, said constantly varying tape speed being a function of the tape roll diameter on the take up reel; and means for driving said tape at a fixed speed during a recording mode;

recording means coupled to said tape travel means for selectively recording a plurality of different cue signals on said tape when said tape is driven at said fixed speed by said travel means, each of said cue signals having respectively different individual frequency information; and detection means coupled to said tape travel means for respectively detecting cue signals recorded on said tape when said tape is caused to travel at said constantly varying speed by said take up reel drive which causes said constantly varying tape traveling speed which is a function of said tape roll diameter on said take up reel;

said recording means recording at least two different cue signals having the following relation:

$$f1/f2 > d1/d2$$

where d1 is the maximum tape roll diameter of said take up reel, d2 is the minimum tape roll diameter of said take up reel, f1 is first frequency information contained in a first recorded cue signal of said detected different cue signals, and f2 is second frequency information of a second recorded cue signal of said detected different cue signals, said second recorded cue signal having a lower frequency than that of said first recorded cue signal, the ratio f1/f2 thereby being sufficiently large that there is substantially no overlap of said first and second frequency information (f1/f2) during cue signal detection by said detection means during said constantly variable tape travel speed produced by said take up reel drive means.

4. The apparatus of claim 3, wherein said detection means includes:

means for reproducing a reproduction signal from said tape in which said cue signals are previously recorded;

first filter means coupled to said reproducing means for extracting from said reproduction signal a first signal corresponding to said first cue signal and containing said first frequency information (f1); and second filter means coupled to said reproducing means for extracting from said reproduction signal a second signal corresponding to said second cue signal and containing said second frequency information (f2).

5. The apparatus of claim 4, wherein said detection means further includes:

first comparison means having a first threshold level and being coupled to said first filter means for providing a first output cue signal when said first signal exceeds said first threshold level; and second comparison means having a second threshold level and being coupled to said second filter means for providing a second output cue signal when said second signal exceeds said second threshold level.

6. The apparatus of claim 4 or 5, wherein each of said first and second frequency information (f1,f2) of said cue signals has a frequency spectrum ($f1_{min}-f1_{max}$, $f2_{min}-f2_{max}$) which is substantially out of the main frequency spectrum of any human voice contained in said reproduction signal.

* * * * *